Dec. 16, 1941.  W. K. EDWARDS  2,266,361
WEIGHT UNIT INDICATING APPARATUS
Filed May 9, 1940   2 Sheets-Sheet 1
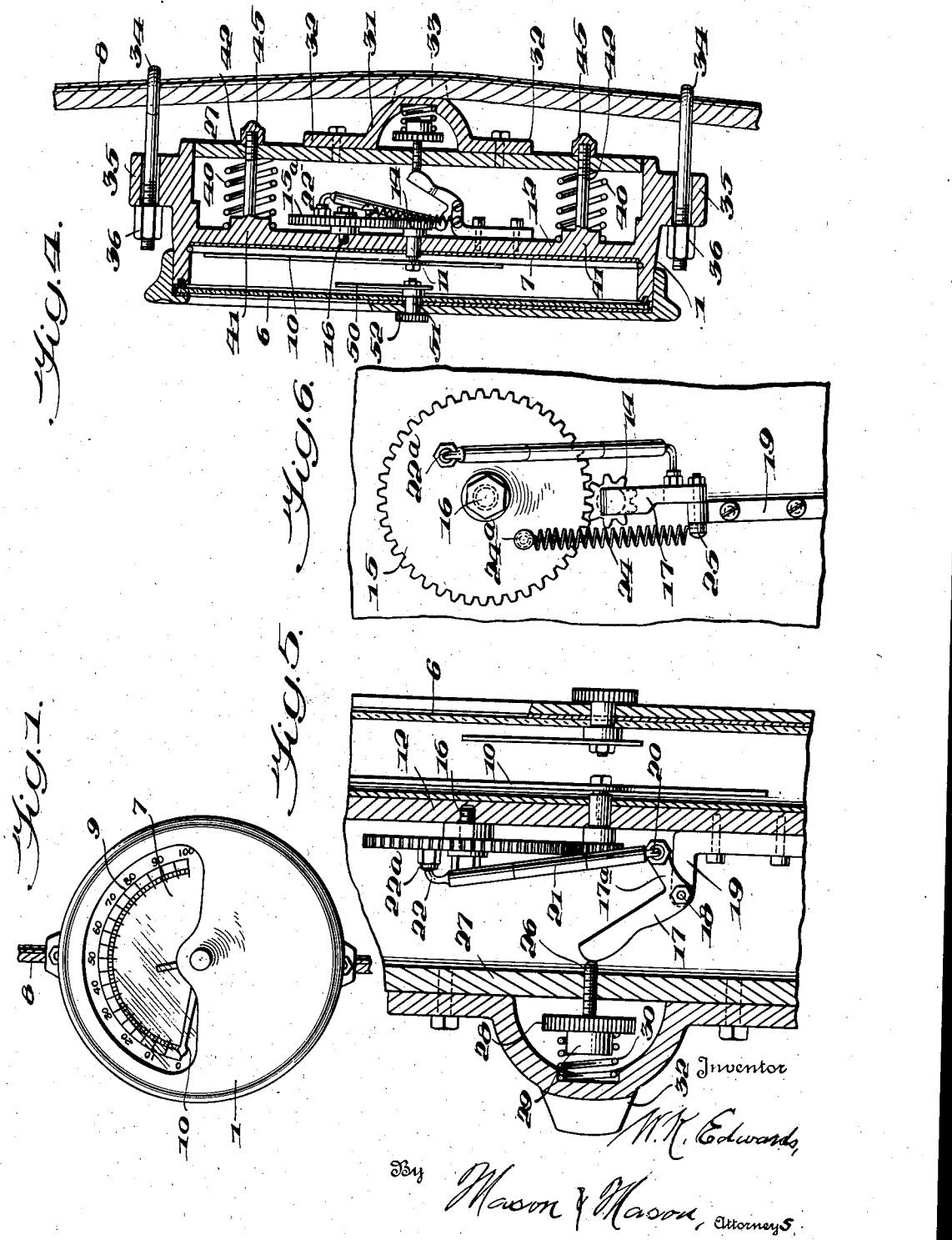

Dec. 16, 1941.        W. K. EDWARDS        2,266,361
WEIGHT UNIT INDICATING APPARATUS
Filed May 9, 1940        2 Sheets-Sheet 2
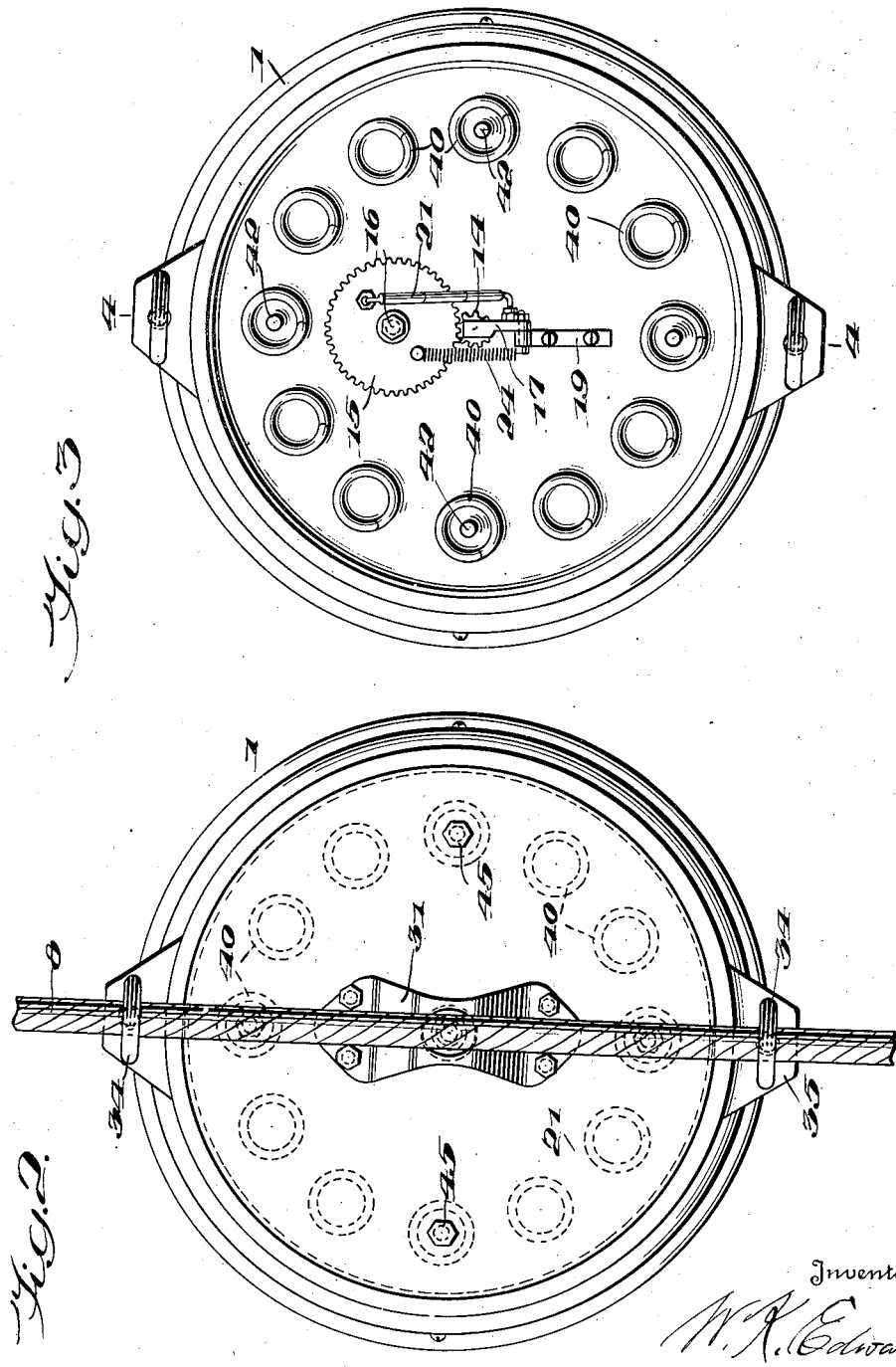

Patented Dec. 16, 1941

2,266,361

UNITED STATES PATENT OFFICE 2,266,361

WEIGHT UNIT INDICATING APPARATUS

William K. Edwards, Big Spring, Tex.

Application May 9, 1940, Serial No. 334,281

5 Claims. (Cl. 265—1.6)

This invention relates to apparatus for indicating weight generally, and more particularly to a meter for indicating the weight of drilling equipment used in oil wells.

The weight unit indicating mechanism of my invention is designed primarily for the purpose of indicating the tension or pull on a cable connected with a rotary well drilling apparatus, or any other apparatus where it is desired to provide for a visible indication of weight suspended from a cable to which the pull of said weight is applied.

One of the important applications of this invention is to the drilling apparatus of rotary well drilling outfits, and where the driller through this apparatus may ascertain at any time the pull upon the cable due to the weight of the drilling equipment in the well, and the relative weight of the drilling tools at the bottom of the well. The drilling meter does not necessarily indicate the weight in pounds, tons, etc., but rather designates weight units represented by the quantity of drilling pipe, drilling tools, and equipment actually in the well hole, the driller knowing the weight of each section of pipe employed so that the device will permit him to regulate the weight of the material on the drilling surface at the bottom of the well.

The invention comprises certain structural details of the weight unit indicator or meter as will be more fully described hereinafter, and the novel features thereof pointed out in the appended claims.

In the accompanying drawings illustrating one embodiment of the invention—

Figure 1 is a view in plan of the face or front of the drilling gage meter;

Figure 2 is a rear view, enlarged as compared with Figure 1, of the drilling meter assembled on a cable;

Figure 3 is a plan view showing the interior of the drilling meter casing with the lid removed;

Figure 4 is a vertical sectional view of the meter on the line 4—4 of Figure 3;

Figure 5 is an enlarged detail view in vertical section illustrating the mechanism for transmitting the pressure from the suspending cable to the pointer of the meter dial, and Figure 6 is an enlarged detail view in plan of the pressure transmitting mechanism between the cable and the pointer on the dial of the gage.

The drilling meter parts are enclosed in a casing 1 which, as well shown in Figure 4, comprises a hollow body member enclosing the drilling meter mechanism, said casing being covered by a glass 6 below which is a dial 7 having a scale 9 thereon suitably calibrated into subdivisions indicating by suitable numerals the pull in pounds, tons, or other units, upon the cable 8. A movable pointer 10 has a stem 11 which passes through a partition 12 in the casing 1, and is rotarily mounted in an aperture in said partition.

A pinion 14 attached to the stem 11 meshes with a gear 15 mounted upon a suitable bearing stud or pin 16 which is firmly affixed to the partition 12. A bell crank lever 17 pivoted at 18 to a bracket 19, which is firmly secured to the partition 12, has a short arm 17a which is connected suitably, as by a ball and socket joint 20 with a link 21, whose opposite end is provided with a curved portion 22 which terminates in a ball and socket joint 22a connected, eccentrically of the pivotal connection 16 of the gear 15, as shown particularly in Figure 6. A coil spring 24, has connection at 24a with the gear 15, at a point eccentric to the pivot 16 of said gear, the opposite end of said spring being connected to a stud 25 on the bracket 19, or to any fixed point.

The longer arm of the bell crank 17 extends upwardly as shown in Figure 5, is normally in contact with the inner end of an adjusting screw 26, which is in threaded engagement with a plate 27 which is movably mounted in the open end portion of the casing. The screw 26 is provided with a knurled wheel 28 for hand adjustment. A projecting boss 29 from the wheel 28 is surrounded by a spiral spring 30 whose purpose is to hold the adjusting screw in any position of adjustment to which it may be turned against accidental misplacement, due to jars, etc. This spring fits in a socket in the underside of a curved abutment 31, which performs the function of a post, is hollow, and is provided with feet 32, which are suitably secured as by bolts to the plate 27. The abutment is provided with a groove 33 forming a curved seat for the suspending cable 8, which as shown in Figure 4, passes through hooks 34, 34, located at diametrically opposite points of the casing 1. As herein shown, these hooks are provided with shanks which pass through perforated lugs 35, and are threaded at their ends to receive nuts 36, whereby said hooks may be adjusted to thereby determine the amount of deflection of the cable 8 as it passes through said hooks and the curved seat 33 in the curved abutment 31.

A plurality of spiral springs 40 are arranged circumferentially within the casing 1 concentrically about the center thereof, said springs being compressed between cylindrical seats or bosses 41, preferably integral with the partition 12, and the plate 27. Stems 42 project centrally from a suitable number of the seats 41, pass through perforations in the plate 27, and are threaded at their terminals to receive clamping nuts 45. Preferably, there are four of these stems located 90° apart, and said stems with their nuts constitute retaining means for the plate 27 and limit its outward movement from the casing due to the stress of the springs 40. The distortion of the springs 40 due to lateral deflection, is prevented by the cylindrical seats 41 which confine the springs to substantially vertical movements, as they are pressed inwardly by the plate 27 due to the stress of the cable 8, and expand outwardly when the stress upon that cable is relieved.

Normally, the stress of the spring 24 will have a tendency to rotate the gear 15 and pinion 14 in a direction to cause rotation of the pointer 10 on the dial 7 and the engagement between the screw 26 and the long arm of the bell crank 17 will prevent such rotation, the screw being adjusted ordinarily to position the pointer at zero on the dial. A manually operable pointer 50 provided with a stem 51 passing through an aperture in the front wall of the casing 1, is provided with a knurled handle 52, whereby the pointer 50 may be rotated in alignment with the pointer 10, at any time to indicate visually the amount of movement of the pointer 10 from any set or predetermined position of indication. Suitable adjustment by rotation of the screw 26, through the knurled wheel 28, having been made to position the pointer 10 at the zero mark, the parts will be in position to test in tons, pounds, or other units, the amount of weight on the cable 8 which extends down into the well and from which the well equipment to be weighed is suspended. With such arrangement of parts, it will be seen that the pull or stress imposed upon the cable 8 through the weight of the cable and the drilling apparatus connected therewith, will cause an inward movement of the plate 27 to compress the springs 40, the amount of such movement being transmitted through the screw 26, bell crank 17, 17a, link 21, gear 15 and pinion 14 to the pointer 10, which is caused to move over the scale 7 an amount corresponding to the stress upon the cable. The movement of the pointer over the dial, accordingly, indicates the weight of the drilling parts which are carried by or supported from the cable 8, whereby the operator may determine the weight of said parts. It is an important feature of this invention that the plate, the amount of whose movement inwardly under the stress of the cable determines, through the described mechanism, the indication of weight on the dial, has as its resistance a plurality of symmetrically arranged springs which are disposed circumferentially and apply their resisting strain equally, to the inward movements of the plate. The plate is thus supported against inward movement equally at all points, which ensures that its movements will be even and direct, and prevents any accidental side tilting or displacement of the plate from its normal position in parallelism with the casing, so that there can be no binding action between the casing and plate during its movements in determining the weight on the cable.

It is thought that the operation of the device will be clearly understood from the foregoing description of the several parts thereof and their relationship with each other. Stresses upon the cable 8 due to the weight of the cable and the drilling apparatus, pulleys, etc., connected with said cable, will be transmitted to the plate 27 through the screw 26, as such stresses tend to straighten the cable which is normally deflected from a straight line, through its connection with the parts 33, 34, 34. The pressure thus transmitted through the cable to the plate 27 is resisted by the springs 40, but when said pressure reaches a predetermined amount which will tend to straighten the cable against the tension of the spring, the plate will move inwardly causing through the set screw 26, pressure upon the bell crank lever 17, 17a, thereby effecting rotation of the gear 15, pinion 14, and pointer 10, the spring 24 being extended a suitable amount in accordance with the amount of rotation of the gear 15. As the pointer moves over the scale 9, it will indicate the number of units of weight applying tension to the cable 8, the parts being so adjusted that the amount of this weight will be truly indicated by the position of the pointer along the scale. If at any time, either through the looseness of the parts, wear, or other conditions, the normal zero position of the pointer should become changed, rotation of the set screw 26 will easily restore the pointer to zero position, preliminary to a weight testing operation of the apparatus.

Having thus described my invention, what I claim is:

1. In a drilling meter, the combination of a casing, a dial thereon, a pointer movable over said dial, a movable plate fitting an opening in said casing, a partition in said casing, a plurality of coil springs arranged between said partition and plate and circularly arranged about the axis of the dial to resist inward movement of said plate, a bell-crank lever mounted for movement in said casing and connecting mechanism between one arm of said bell-crank lever and the pointer, an abutment on the plate having means operatively engaging the other arm of the bell-crank lever to effect through its movement the travel of the pointer over the dial, a post mounted centrally of said plate for engagement with the cable of a drilling apparatus, and means carried by said casing on opposite sides of said post for engaging the cable and cooperating with the post in maintaining a normal deflection of the cable from a straight line.

2. A drilling meter of the class described, comprising in combination a casing, a dial thereon, a pointer supported for movement over the dial, a plurality of springs in said casing arranged concentrically to the center of said dial, a movable plate mounted in an opening in said casing and engaging said springs, operative connections between said plate and the pointer, a post centrally of said plate for engagement with the cable of a drilling apparatus, and means carried by said casing on opposite sides of said post for engaging the cable and cooperating with the post in maintaining a normal deflection of the cable from a straight line.

3. In a device of the class described, the combination of a casing, a dial thereon, a pointer mounted for movement over the dial, a pinion carried by said pointer, a gear meshing with said pinion, a bell crank lever supported for movement in the casing having one arm connected with said gear, a movable plate in said casing, a plurality of circularly arranged springs in the casing engaging said plate and resisting its inward movement, an adjustable abutment carried by the plate and engaging the second arm of the bell crank lever, and means carried by said casing and plate for supporting a cable and maintaining it normally deflected from a straight line.

4. In a device of the class described, the combination of a casing, a partition in said casing, a movable plate closing an open end of said casing on one side of said partition, a plurality of circularly arranged springs mounted between said partition and plate in said casing and opposing the inward movement of the plate, a dial carried by the casing on the opposite side of the partition, a pointer movable over the dial, a pinion connected with said pointer, a gear meshing with said pinion, a bell-crank lever mounted in said casing and having one arm connected with said gear, an adjustable screw threaded to said plate and arranged to project inwardly of the casing and to engage the other arm of the bell-crank lever, a hook rigidly extending from said casing and arranged to receive a cable, a second hook adjustably mounted on said casing and arranged to engage the cable at a point diametrically opposite the first-named hook, and an abutment located on said plate between said hooks and having a seat to receive the cable and hold it in deflected condition.

5. In a drilling meter, the combination of a casing, a dial thereon, a pointer mounted for rotary movement in said casing over the dial, a pinion connected with said pointer, a gear meshing with said pinion, a spring extending from a fixed point in the casing to an eccentrically located pin on said gear, a bell-crank lever pivotally mounted within said casing, a rod connected eccentrically with said gear at one end and its opposite end connected with one arm of said bell crank lever, a movable plate in said casing provided with an adjusting screw engaging the other arm of the bell crank lever, a plurality of circularly arranged coil springs mounted in the casing and bearing upon said plate to resist its inward movement, rigid guiding stems projecting through some of said coil springs and extending through apertures in said plate, nuts threaded to the outer ends of said stems and bearing against the outer face of said plate, and means carried by said casing and plate to receive a drilling cable and hold said cable in a deflected condition until a predetermined tension is applied to the cable, whereby the plate is moved inward against the stress of the springs and the pointer is caused to travel over the dial an amount determined by the weight on the cable.

WILLIAM K. EDWARDS.